United States Patent
Aborn (10) Patent No.: US 10,771,541 B2
(45) Date of Patent: *Sep. 8, 2020

(54) AUTOMATED MANAGEMENT OF CONTENT SERVERS BASED ON CHANGE IN DEMAND

(71) Applicant: LEVEL 3 COMMUNICATIONS, LLC, Broomfield, CO (US)

(72) Inventor: Justin Aborn, Hingham, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/149,394

(22) Filed: May 9, 2016

(65) Prior Publication Data

US 2016/0255145 A1 Sep. 1, 2016

Related U.S. Application Data (63) Continuation of application No. 12/048,669, filed on Mar. 14, 2008, now Pat. No. 9,338,227, which is a continuation of application No. 09/969,437, filed on Oct. 2, 2001, now Pat. No. 7,373,644.

(51) Int. Cl.
*G06F 9/46* (2006.01)
*H04L 29/08* (2006.01)
*H04L 29/06* (2006.01)
*G06F 9/50* (2006.01)

(52) U.S. Cl.
CPC ...... *H04L 67/1031* (2013.01); *H04L 67/1008* (2013.01); *H04L 67/1012* (2013.01); *H04L 67/42* (2013.01); *G06F 9/505* (2013.01); *H04L 67/02* (2013.01); *H04L 67/1002* (2013.01); *H04L 67/1029* (2013.01)

(58) Field of Classification Search
None
See application file for complete search history.

(56) References Cited

U.S. PATENT DOCUMENTS

| | | | |
|---|---|---|---|
| 4,495,570 A | 1/1985 | Kitajima et al. |
| 4,591,983 A | 5/1986 | Bennett et al. |
| 4,594,704 A | 6/1986 | Ollivier |
| 4,726,017 A | 2/1988 | Krum et al. |

(Continued)

FOREIGN PATENT DOCUMENTS

| | | |
|---|---|---|
| CA | 2202572 | 10/1998 |
| EP | 0800143 A2 | 10/1997 |

(Continued)

OTHER PUBLICATIONS

"Cisco Distributed Director", http://wyvw.Gj'517'90.cQmj~vafQLQuQltc[751/distdir/dd_wp.htm 1997, 16 pages.

(Continued)

*Primary Examiner* — Bradley A Teets (57) ABSTRACT

Methods and apparatus for detecting a change in demand for server resources across a load-bearing system having one or more content servers hosting identical content, the load-bearing system being connected to a network of content servers; and automatically modifying the number of content servers on the load-bearing system in response to the change in demand.

5 Claims, 5 Drawing Sheets

(56) References Cited

U.S. PATENT DOCUMENTS

| | | |
|---|---|---|
| 4,803,641 A | 2/1989 | Hardy et al. |
| 4,839,798 A | 6/1989 | Eguchi et al. |
| 4,847,784 A | 7/1989 | Clancey |
| 4,920,432 A | 4/1990 | Eggers et al. |
| 4,922,417 A | 5/1990 | Churm et al. |
| 4,943,932 A | 7/1990 | Lark et al. |
| 4,949,187 A | 8/1990 | Cohen |
| 4,949,248 A | 8/1990 | Caro |
| 5,029,232 A | 7/1991 | Nall |
| 5,070,191 A | 12/1991 | Yamada et al. |
| 5,130,792 A | 7/1992 | Tindell et al. |
| 5,132,992 A | 7/1992 | Yurt et al. |
| 5,136,716 A | 8/1992 | Harvey et al. |
| 5,172,413 A | 12/1992 | Bradley et al. |
| 5,191,573 A | 3/1993 | Hair |
| 5,253,275 A | 10/1993 | Yurt et al. |
| 5,253,341 A | 10/1993 | Rozmanith et al. |
| 5,287,499 A | 2/1994 | Nemes |
| 5,287,537 A | 2/1994 | Newmark et al. |
| 5,291,554 A | 3/1994 | Morales |
| 5,341,477 A | 8/1994 | Pitkin et al. |
| 5,371,532 A | 12/1994 | Gelman et al. |
| 5,410,343 A | 4/1995 | Coddington et al. |
| 5,414,455 A | 5/1995 | Hooper et al. |
| 5,442,389 A | 8/1995 | Blahut et al. |
| 5,442,390 A | 8/1995 | Hooper et al. |
| 5,442,749 A | 8/1995 | Northcutt et al. |
| 5,471,622 A | 11/1995 | Eadline |
| 5,475,615 A | 12/1995 | Lin |
| 5,508,732 A | 4/1996 | Bottomley et al. |
| 5,515,511 A | 5/1996 | Nguyen et al. |
| 5,519,435 A | 5/1996 | Anderson |
| 5,528,281 A | 6/1996 | Grady et al. |
| 5,539,621 A | 7/1996 | Kikinis |
| 5,542,087 A | 7/1996 | Neimat et al. |
| 5,544,313 A | 8/1996 | Shachnai et al. |
| 5,544,327 A | 8/1996 | Dan et al. |
| 5,550,577 A | 8/1996 | Verbiest et al. |
| 5,550,863 A | 8/1996 | Yurt et al. |
| 5,550,982 A | 8/1996 | Long et al. |
| 5,557,317 A | 9/1996 | Nishio et al. |
| 5,572,643 A | 11/1996 | Judson |
| 5,590,288 A | 12/1996 | Castor et al. |
| 5,592,611 A | 1/1997 | Midgely et al. |
| 5,594,910 A | 1/1997 | Filepp et al. |
| 5,603,026 A | 2/1997 | Demers et al. |
| 5,619,648 A | 4/1997 | Canale et al. |
| 5,623,656 A | 4/1997 | Lyons |
| 5,625,781 A | 4/1997 | Cline et al. |
| 5,627,829 A | 5/1997 | Gleeson et al. |
| 5,630,067 A | 5/1997 | Kindell et al. |
| 5,633,999 A | 5/1997 | Clowes et al. |
| 5,634,006 A | 5/1997 | Baugher et al. |
| 5,638,443 A | 6/1997 | Stefik et al. |
| 5,644,714 A | 7/1997 | Kikinis |
| 5,646,676 A | 7/1997 | Dewkett et al. |
| 5,649,186 A | 7/1997 | Ferguson |
| 5,659,729 A | 8/1997 | Nielsen |
| 5,666,362 A | 9/1997 | Chen et al. |
| 5,671,279 A | 9/1997 | Elgamal |
| 5,675,734 A | 10/1997 | Hair |
| 5,682,512 A | 10/1997 | Tetrick |
| 5,699,513 A | 12/1997 | Feigen et al. |
| 5,712,979 A | 1/1998 | Graber et al. |
| 5,715,453 A | 2/1998 | Stewart |
| 5,721,914 A | 2/1998 | DeVries |
| 5,734,831 A | 3/1998 | Sanders |
| 5,740,423 A | 4/1998 | Logan et al. |
| 5,742,762 A | 4/1998 | Scholl et al. |
| 5,751,961 A | 5/1998 | Smyk |
| 5,751,967 A | 5/1998 | Raab et al. |
| 5,761,507 A | 6/1998 | Govett |
| 5,761,663 A | 6/1998 | Lagarde et al. |
| 5,764,906 A | 6/1998 | Edelstein et al. |
| 5,774,660 A | 6/1998 | Brendel et al. |
| 5,774,668 A | 6/1998 | Choquier et al. |
| 5,777,989 A | 7/1998 | McGarvey |
| 5,784,058 A | 7/1998 | LaStrange et al. |
| 5,796,952 A | 8/1998 | Davis et al. |
| 5,799,141 A | 8/1998 | Galipeau et al. |
| 5,802,106 A | 9/1998 | Packer |
| 5,802,291 A | 9/1998 | Balick et al. |
| 5,812,769 A | 9/1998 | Graber et al. |
| 5,815,664 A | 9/1998 | Asano |
| 5,828,847 A | 10/1998 | Gehr et al. |
| 5,832,506 A | 11/1998 | Kuzma |
| 5,832,514 A | 11/1998 | Norin et al. |
| 5,835,718 A | 11/1998 | Blewett |
| 5,845,303 A | 12/1998 | Templeman |
| 5,856,974 A | 1/1999 | Gervais et al. |
| 5,862,339 A | 1/1999 | Bonnaure et al. |
| 5,867,706 A | 2/1999 | Martin et al. |
| 5,867,799 A | 2/1999 | Lang et al. |
| 5,870,546 A | 2/1999 | Kirsch |
| 5,870,559 A | 2/1999 | Leshem et al. |
| 5,878,212 A | 3/1999 | Civanlar et al. |
| 5,884,038 A | 3/1999 | Kapoor |
| 5,890,171 A | 3/1999 | Blumer et al. |
| 5,893,116 A | 4/1999 | Simmonds et al. |
| 5,894,554 A | 4/1999 | Lowery et al. |
| 5,896,533 A | 4/1999 | Ramos et al. |
| 5,903,723 A | 5/1999 | Beck et al. |
| 5,907,704 A | 5/1999 | Gudmundson et al. |
| 5,913,028 A | 6/1999 | Wang et al. |
| 5,913,033 A | 6/1999 | Grout |
| 5,915,095 A | 6/1999 | Miskowiec |
| 5,918,010 A | 6/1999 | Appleman et al. |
| 5,919,247 A | 7/1999 | Van Hoff et al. |
| 5,920,701 A | 7/1999 | Miller et al. |
| 5,933,832 A | 8/1999 | Suzuoka et al. |
| 5,935,207 A | 8/1999 | Logue et al. |
| 5,945,989 A | 8/1999 | Freishtat et al. |
| 5,956,489 A | 9/1999 | San Andres et al. |
| 5,956,716 A | 9/1999 | Kenner et al. |
| 5,958,008 A | 9/1999 | Pogrebisky et al. |
| 5,961,596 A | 10/1999 | Takubo et al. |
| 5,966,440 A | 10/1999 | Hair |
| 5,968,121 A | 10/1999 | Logan et al. |
| 5,978,791 A | 11/1999 | Farber et al. |
| 5,983,214 A | 11/1999 | Lang et al. |
| 5,983,227 A | 11/1999 | Nazem et al. |
| 5,987,606 A | 11/1999 | Cirasole et al. |
| 5,991,809 A | 11/1999 | Kriegsman et al. |
| 6,002,720 A | 12/1999 | Yurt et al. |
| 6,003,030 A | 12/1999 | Kenner et al. |
| 6,006,264 A | 12/1999 | Colby et al. |
| 6,012,090 A | 1/2000 | Chung et al. |
| 6,014,686 A | 1/2000 | Elnozahy et al. |
| 6,014,698 A | 1/2000 | Griffiths |
| 6,018,516 A | 1/2000 | Packer |
| 6,026,440 A | 2/2000 | Shrader et al. |
| 6,029,175 A | 2/2000 | Chow et al. |
| 6,029,176 A | 2/2000 | Cannon |
| 6,035,332 A | 3/2000 | Ingrassia et al. |
| 6,038,216 A | 3/2000 | Packer |
| 6,038,310 A | 3/2000 | Hollywood et al. |
| 6,038,610 A | 3/2000 | Belfiore et al. |
| 6,041,324 A | 3/2000 | Earl et al. |
| 6,044,405 A | 3/2000 | Driscoll et al. |
| 6,046,980 A | 4/2000 | Packer |
| 6,049,831 A | 4/2000 | Gardell et al. |
| 6,052,718 A | 4/2000 | Gifford |
| 6,052,730 A | 4/2000 | Felciano et al. |
| 6,065,051 A | 5/2000 | Steele et al. |
| 6,065,062 A | 5/2000 | Periasamy et al. |
| 6,070,191 A | 5/2000 | Narendran et al. |
| 6,081,829 A | 6/2000 | Sidana |
| 6,092,112 A | 7/2000 | Fukushige |
| 6,092,204 A | 7/2000 | Baker et al. |
| 6,105,028 A | 8/2000 | Sullivan et al. |
| 6,108,673 A | 8/2000 | Brandt et al. |
| 6,108,703 A | 8/2000 | Leighton et al. |
| 6,112,231 A | 8/2000 | DeSimone et al. |
| 6,112,239 A | 8/2000 | Kenner et al. |

(56) References Cited

U.S. PATENT DOCUMENTS

| | | | |
|---|---|---|---|
| 6,112,240 A | 8/2000 | Pogue et al. |
| 6,115,357 A | 9/2000 | Packer et al. |
| 6,115,752 A | 9/2000 | Chauhan |
| 6,119,143 A | 9/2000 | Dias et al. |
| 6,125,388 A | 9/2000 | Reisman |
| 6,128,601 A | 10/2000 | Van Horne et al. |
| 6,128,660 A | 10/2000 | Grimm et al. |
| 6,130,890 A | 10/2000 | Leinwand et al. |
| 6,134,583 A | 10/2000 | Herriot |
| 6,144,375 A | 11/2000 | Jain et al. |
| 6,144,702 A | 11/2000 | Yurt et al. |
| 6,144,996 A | 11/2000 | Starnes et al. |
| 6,151,624 A | 11/2000 | Teare et al. |
| 6,154,738 A | 11/2000 | Call |
| 6,154,744 A | 11/2000 | Kenner et al. |
| 6,154,753 A | 11/2000 | McFarland |
| 6,154,777 A | 11/2000 | Ebrahim |
| 6,163,779 A | 12/2000 | Mantha et al. |
| 6,167,427 A | 12/2000 | Rabinovich et al. |
| 6,173,311 B1 | 1/2001 | Hassett et al. |
| 6,173,322 B1 | 1/2001 | Hu |
| 6,175,869 B1 | 1/2001 | Ahuja et al. |
| 6,178,160 B1 | 1/2001 | Bolton et al. |
| 6,181,867 B1 | 1/2001 | Kenner et al. |
| 6,185,598 B1 | 2/2001 | Farber et al. |
| 6,185,619 B1 | 2/2001 | Joffe et al. |
| 6,189,030 B1 | 2/2001 | Kirsch et al. |
| 6,205,120 B1 | 3/2001 | Packer et al. |
| 6,226,642 B1 | 5/2001 | Beranek et al. |
| 6,230,196 B1 | 5/2001 | Guenthner et al. |
| 6,243,760 B1 | 6/2001 | Armbruster et al. |
| 6,249,810 B1 | 6/2001 | Kiraly |
| 6,256,675 B1 | 7/2001 | Rabinovich |
| 6,266,699 B1 | 7/2001 | Sevcik |
| 6,269,394 B1 | 7/2001 | Kenner et al. |
| 6,275,470 B1 | 8/2001 | Ricciulli |
| 6,282,569 B1 | 8/2001 | Wallis et al. |
| 6,282,574 B1 | 8/2001 | Voit |
| 6,286,045 B1 | 9/2001 | Griffith et al. |
| 6,298,041 B1 | 10/2001 | Packer |
| 6,311,214 B1 | 10/2001 | Rhoads |
| 6,314,465 B1 | 11/2001 | Paul et al. |
| 6,314,565 B1 | 11/2001 | Kenner et al. |
| 6,332,195 B1 | 12/2001 | Green et al. |
| 6,338,044 B1 | 1/2002 | Cook et al. |
| 6,347,085 B2 | 2/2002 | Kelly et al. |
| 6,360,256 B1 | 3/2002 | Lim |
| 6,370,571 B1 | 4/2002 | Medin |
| 6,370,580 B2 | 4/2002 | Kriegsman |
| 6,374,299 B1 | 4/2002 | Ford et al. |
| 6,405,252 B1 | 6/2002 | Gupta et al. |
| 6,405,257 B1 | 6/2002 | Gersht et al. |
| 6,412,000 B1 | 6/2002 | Riddle et al. |
| 6,412,002 B1 | 6/2002 | Denman et al. |
| 6,415,280 B1 | 7/2002 | Farber et al. |
| 6,421,726 B1 | 7/2002 | Kenner et al. |
| 6,430,618 B1 | 8/2002 | Karger et al. |
| 6,442,549 B1 | 8/2002 | Schneider |
| 6,456,630 B1 | 9/2002 | Packer et al. |
| 6,460,085 B1 | 10/2002 | Toporek et al. |
| 6,473,405 B2 | 10/2002 | Ricciulli |
| 6,480,893 B2 | 11/2002 | Kriegsman |
| 6,484,143 B1 | 11/2002 | Swildens et al. |
| 6,484,204 B1 | 11/2002 | Rabinovich |
| 6,490,580 B1 | 12/2002 | Dey et al. |
| 6,490,611 B1 * | 12/2002 | Shen ................ G06F 9/4887 718/100 |
| 6,493,707 B1 | 12/2002 | Dey et al. |
| 6,496,856 B1 | 12/2002 | Kenner et al. |
| 6,502,125 B1 | 12/2002 | Kenner et al. |
| 6,502,215 B2 | 12/2002 | Raad et al. |
| 6,505,248 B1 | 1/2003 | Casper et al. |
| 6,529,477 B1 | 3/2003 | Toporek et al. |
| 6,553,413 B1 | 4/2003 | Leighton et al. |
| 6,553,420 B1 | 4/2003 | Karger et al. |
| 6,557,054 B2 | 4/2003 | Reisman |
| 6,564,251 B2 | 5/2003 | Katariya et al. |
| 6,574,612 B1 | 6/2003 | Baratti et al. |
| 6,577,595 B1 | 6/2003 | Counterman |
| 6,581,090 B1 | 6/2003 | Lindbo et al. |
| 6,584,083 B1 | 6/2003 | Toporek et al. |
| 6,591,299 B2 | 7/2003 | Riddle et al. |
| 6,601,084 B1 | 7/2003 | Bhaskaran et al. |
| 6,611,862 B2 | 8/2003 | Reisman |
| 6,625,643 B1 | 9/2003 | Colby et al. |
| 6,636,499 B1 | 10/2003 | Dowling |
| 6,654,344 B1 | 11/2003 | Toporek et al. |
| 6,654,807 B2 | 11/2003 | Farber et al. |
| 6,658,464 B2 | 12/2003 | Reisman |
| 6,665,706 B2 | 12/2003 | Kenner et al. |
| 6,665,726 B1 | 12/2003 | Leighton et al. |
| 6,691,148 B1 | 2/2004 | Zinky et al. |
| 6,694,358 B1 | 2/2004 | Swildens et al. |
| 6,699,418 B2 | 3/2004 | Okada et al. |
| 6,708,137 B2 | 3/2004 | Carley |
| 6,718,328 B1 | 4/2004 | Norris |
| 6,741,563 B2 | 5/2004 | Packer |
| 6,751,673 B2 | 6/2004 | Shaw |
| 6,754,699 B2 | 6/2004 | Swildens et al. |
| 6,754,706 B1 | 6/2004 | Swildens et al. |
| 6,763,388 B1 | 7/2004 | Tsimelzon |
| 6,778,502 B2 | 8/2004 | Ricciulli |
| 6,795,858 B1 | 9/2004 | Jain et al. |
| 6,799,221 B1 | 9/2004 | Kenner et al. |
| 6,801,576 B1 | 10/2004 | Haldeman et al. |
| 6,834,306 B1 | 12/2004 | Tsimelzon |
| 6,842,604 B1 | 1/2005 | Cook et al. |
| 6,859,926 B1 | 2/2005 | Brenner et al. |
| 6,870,851 B1 | 3/2005 | Leinwand et al. |
| 6,874,032 B2 | 3/2005 | Gersht et al. |
| 6,901,604 B1 | 5/2005 | Kiraly |
| 6,915,329 B2 | 7/2005 | Kriegsman |
| 6,928,442 B2 | 8/2005 | Farber et al. |
| 6,934,255 B1 | 8/2005 | Toporek et al. |
| 6,950,623 B2 | 9/2005 | Brown et al. |
| 6,963,980 B1 | 11/2005 | Mattsson |
| 6,963,981 B1 | 11/2005 | Bailey et al. |
| 6,965,890 B1 | 11/2005 | Dey et al. |
| 6,970,432 B1 | 11/2005 | Hankins et al. |
| 6,973,485 B2 | 12/2005 | Ebata et al. |
| 6,973,490 B1 | 12/2005 | Robertson et al. |
| 6,981,050 B1 | 12/2005 | Tobias et al. |
| 6,981,180 B1 | 12/2005 | Bailey et al. |
| 6,996,616 B1 | 2/2006 | Leighton et al. |
| 7,003,572 B1 | 2/2006 | Lownsbrough et al. |
| 7,007,089 B2 | 2/2006 | Freedman |
| 7,010,578 B1 | 3/2006 | Lewin et al. |
| 7,012,900 B1 | 3/2006 | Riddle |
| 7,039,633 B1 | 5/2006 | Dey et al. |
| 7,047,300 B1 | 5/2006 | Oehrke et al. |
| 7,054,935 B2 | 5/2006 | Farber et al. |
| 7,058,706 B1 | 6/2006 | Iyer et al. |
| 7,069,177 B2 | 6/2006 | Carley |
| 7,096,266 B2 | 8/2006 | Lewin et al. |
| 7,103,645 B2 | 9/2006 | Leighton et al. |
| 7,181,523 B2 | 2/2007 | Sim |
| 7,257,817 B2 | 8/2007 | Cabrera et al. |
| 7,373,644 B2 * | 5/2008 | Aborn ................ H04L 67/1008 709/223 |
| 9,338,227 B2 * | 5/2016 | Aborn ................ H04L 67/1008 |
| 2001/0029525 A1 | 10/2001 | Lahr |
| 2001/0042139 A1 | 11/2001 | Jeffords et al. |
| 2001/0056500 A1 | 12/2001 | Farber et al. |
| 2002/0018449 A1 | 2/2002 | Ricciulli |
| 2002/0023164 A1 | 2/2002 | Lahr |
| 2002/0023165 A1 | 2/2002 | Lahr |
| 2002/0026560 A1 | 2/2002 | Jordan et al. |
| 2002/0032777 A1 | 3/2002 | Kawata et al. |
| 2002/0040404 A1 | 4/2002 | Lahr |
| 2002/0042817 A1 | 4/2002 | Lahr |
| 2002/0046273 A1 | 4/2002 | Lahr et al. |
| 2002/0046405 A1 | 4/2002 | Lahr |
| 2002/0049857 A1 | 4/2002 | Farber et al. |
| 2002/0059592 A1 | 5/2002 | Kiraly |

(56) References Cited

U.S. PATENT DOCUMENTS

| | | |
|---|---|---|
| 2002/0066038 A1 | 5/2002 | Mattsson et al. |
| 2002/0073199 A1 | 6/2002 | Levine et al. |
| 2002/0078263 A1 | 6/2002 | Darling et al. |
| 2002/0082999 A1 | 6/2002 | Lee et al. |
| 2002/0083124 A1 | 6/2002 | Knox et al. |
| 2002/0099850 A1 | 7/2002 | Farber et al. |
| 2002/0124080 A1 | 9/2002 | Leighton et al. |
| 2002/0129134 A1 | 9/2002 | Leighton et al. |
| 2002/0131645 A1 | 9/2002 | Hamilton |
| 2002/0143798 A1 | 10/2002 | Lisiecki et al. |
| 2002/0143888 A1 | 10/2002 | Lisiecki et al. |
| 2002/0147774 A1 | 10/2002 | Lisiecki et al. |
| 2002/0163882 A1 | 11/2002 | Bornstein et al. |
| 2002/0166117 A1 | 11/2002 | Abrams et al. |
| 2002/0194350 A1 | 12/2002 | Lu et al. |
| 2002/0199016 A1 | 12/2002 | Freedman |
| 2003/0009444 A1 | 1/2003 | Eidler et al. |
| 2003/0018966 A1 | 1/2003 | Cook et al. |
| 2003/0028623 A1 | 2/2003 | Hennessey et al. |
| 2003/0028626 A1 | 2/2003 | Hennessey et al. |
| 2003/0028777 A1 | 2/2003 | Hennessey et al. |
| 2003/0041238 A1 | 2/2003 | French et al. |
| 2003/0055972 A1 | 3/2003 | Fuller et al. |
| 2003/0061263 A1 | 3/2003 | Riddle et al. |
| 2003/0061280 A1 | 3/2003 | Bulson et al. |
| 2003/0065761 A1 | 4/2003 | Cereja et al. |
| 2003/0078888 A1 | 4/2003 | Lee et al. |
| 2003/0078889 A1 | 4/2003 | Lee et al. |
| 2003/0105604 A1 | 6/2003 | Ash et al. |
| 2003/0154279 A1 | 8/2003 | Aziz |
| 2003/0191822 A1 | 10/2003 | Leighton et al. |
| 2004/0022194 A1 | 2/2004 | Ricciulli |
| 2004/0139097 A1 | 7/2004 | Farber et al. |
| 2004/0177148 A1 | 9/2004 | Tsimelzon, Jr. |
| 2005/0033858 A1 | 2/2005 | Swildens et al. |
| 2005/0038851 A1 | 2/2005 | Kriegsman |
| 2005/0100027 A1 | 5/2005 | Leinwand et al. |
| 2005/0114296 A1 | 5/2005 | Farber et al. |
| 2005/0262104 A1 | 11/2005 | Robertson et al. |
| 2006/0080267 A1* | 4/2006 | Nelken ............... G06F 9/4881 706/12 |
| 2006/0153293 A1 | 7/2006 | Hsu et al. |
| 2014/0201373 A1* | 7/2014 | Smith .................. G06Q 30/00 709/226 |

FOREIGN PATENT DOCUMENTS

| | | | |
|---|---|---|---|
| EP | 0801487 | A2 | 10/1997 |
| EP | 0817444 | A2 | 1/1998 |
| EP | 0824236 | A2 | 2/1998 |
| EP | 0865180 | A2 | 9/1998 |
| GB | 2281793 | A1 | 3/1995 |
| JP | 07066829 | | 3/1995 |
| JP | 10027148 | A2 | 1/1998 |
| JP | 10093552 | | 4/1998 |
| JP | 10126445 | | 5/1998 |
| JP | 10171727 | | 6/1998 |
| JP | 01053793 | A2 | 2/2001 |
| WO | WO-1996/042041 | A2 | 12/1996 |
| WO | WO-1997/011429 | A1 | 3/1997 |
| WO | WO-1997/029423 | A1 | 8/1997 |
| WO | WO-1998/004985 | A1 | 2/1998 |
| WO | WO-1998/006033 | A1 | 2/1998 |
| WO | WO-1999/040514 | A1 | 8/1998 |
| WO | WO-1999/009726 | A1 | 2/1999 |
| WO | WO-1999/029083 | A1 | 6/1999 |
| WO | WO-2000/052594 | A2 | 9/2000 |

OTHER PUBLICATIONS

"Content Management TechnologyIIndustry News", Content Technologies Trends and Advice, Gilbane Report News for Jun. 1999 Jun. 1999, 21 pages.

"Exporting Web Server Final Report", http://www.cs.technion.ac.il/Labs/Lccn/projects/spring97/project4/final_report.html (downloaded Jul. 7, 2007). Spring 1997.

"IBM Technical Disclosure Bulletin; Local Area Network Server Replacement Procedure", vol. 38, No. 1 (Jan. 1995), 235-236.

"Overview of the Cisco DistributedDirector 2500 Series" downloaded Apr. 2007: http://www.cisco.com/univercd/cc/td/doc/productliaabu/distrdir/dd250_1t. Cisco DistributedDirector 2500 Series Installation and Configuration Guide, Pub Date unknown, pp. xix-xxii; 1-1 to 1-12; 6-1 to 6-18; 7-1 to 7-18; 8-1 to 8-24.

"Overview of the Cisco DistributedDirector 4700-M" downloaded Apr. 2007 from http://www.cisco.com/univercd/cc/td/doc/product/iaabu/distrdir/dd4700m Cisco DistributedDirector 4700-M Installation and Configuration Guide pp. Xix-xxii; 1-1 to 1-14; 7-1 to 7-18, 8-1 to 8-20; pub. Date unknown.

Adler, R. M., "Distributed Coordination Models for Client/Server Computing", Computer 28, Apr. 4, 1995, 14-22.

Andresen, D. et al., "Multiprocessor scheduling with client resources to improve the response time of WWW applications" *ACM Press*, NY, Proc. 11th Inti Conf. on Supercomputing (Austria, ICS '97) Jul. 1997, 92-99.

Andresen, et al., "SWEB: Towards a Scalable World Wide Web Server on Multicomputers", Proc. IPPS Apr. 15, 1996, 850-856.

Basturk, E. et al., "Using network layer anycast for load distribution in the Internet", Tech. Rep., IBM TJ. Watson Research Center Jul. 1997, 21 pgs.

Berners-Lee, et al., "Uniform Resource Locators (URL)" *RFC 1738* University of Minnesota Dec. 1994, 1-25.

Bestavros, et al., "Server-Initiated Document Dissemination for the WWW", IEEE Data Engineering Bulletin Sep. 1996, 19(3): 3-11.

Bestavros, A., "Speculative Data Dissermination and Service to Reduce Server Load Network Traffic and Service Time in Distributed Information Systems", In Proc. ICDE '96: The 1996 Int'l Conf. on Data Engineering (Mar. 1996), 4 Pages.

Bhattacharjee, et al., "Application-layer anycasting", In Proc. IEEE INFOCOM '97, 1997, 1-9.

Braun, H. et al., "Web traffic characterization: an assessment of the impact of caching documents from NCSA's web server", Comput. Netw. ISDN Syst. 28, Dec. 1-2, 1995, 37-51.

Brisco, T. P., "T. P. RFC 1794: DNS support for load balancing", Apr. 1995, 1-7.

Carter, et al., "Dynamic server selection using bandwidth probing in wide-area networks", Tech. Rep. BU-CS-96-007, Compo Sci. Dept., Boston University Mar. 1996, 1-20.

Carter, et al., "Server selection using dynamic path characterization in Wide-Area Networks", IEEE INFOCOM '97 1997, pp. 1014-1021.

Carter, J. L. et al., "Universal Classes of Hash Functions" *Journal of Computer and System Sciences* vol. 18, No. 2 Apr. 1979, 106-112.

Chankhunthod, A. et al., "A Hierarchical Internet Object Cache" *Proc. of the 1996 USENIX Technical Conf.* Jan. 1996, 153-163.

Cohen, J. et al., "Cache Array Routing Protocol v1.1", http://tools.ietf.org/id/draft-vinod-carp-v1-01.txt (Last-Modified: Wed, Oct. 1, 1997) Sep. 29, 1997, 8 pages.

Colajanni, et al., "Adaptive TTL schemes for load balancing of distributed Web servers", SIGMETRICS Perform. Eval. Rev. 25,Sep. 2, 1997, 36-42.

Cormen, T. H. et al., "Introduction to Algorithms. Hash Tables. Bibliography", *The MIT Press*, Cambridge, Massachusetts,(1990) 1990, 219-243, 991-993.

Crovella, et al., "Dynamic server selection in the Internet", 3rd IEEE Workshop on the Arch. and Implementation of High Performance Computer Sys. '95 Aug. 1995, pp. 158-162.

Danzig, P. B. et al., "An analysis of wide-area name server traffic: a study of the Internet Domain Name System", Conf. Proc. Communications Architectures & Protocols; D. Oran, Ed. SIGCOMM '92; ACM Press, New York, NY Aug. 1992, 281-292.

De Bra, P.M.E. et al., "Information Retrieval in the World Wide Web: Making Client-Based Searching Feasible", Computer Networks and ISDN System, NL, North Holland Publishing, Amsterdam, vol. 27, No. 2, ISSN: 0169-7552 Nov. 1, 1994, 183-192.

(56) References Cited

OTHER PUBLICATIONS

Deering, S. E. et al., "Multicast routing in datagram internetworks and extended LANs", ACM Trans.Comput. Syst. 8,May 2, 1990, 85-110.
Devine, R., "Design and Implementation of DDH: A Distributed Dynamic Hashing Algorithm", In Proc. 4th Int'l Conf. on Foundations of Data Organizations and Algorithms Oct. 1993, 101-114.
Doi, K., "Super Proxy Script—How to make distributed proxy servers by URL hashing", Sharp Corp., http://naragw.sharp.co.jp/sps/; download Jul. 7, 2007. dates unknown (1996-2000).
Feeley, M. et al., "Implementing Global Memory Management in a Workstation Cluster", In Proc. 15th ACM Symp. on Operating Systems Principles Dec. 1995, 201-212.
Floyd, S. et al., "A Reliable Multicast Framework for Light-Weight Sessions and Application Level Framing", In Proc. of ACM SIGCOMM '95, Aug. 1995, 342-356.
Fox, A. et al., "A Framework for Separating Server Scalability and Availability from Internet Application Functionality", PhD thesis, University of California, Berkeley, 1998, 163 pgs.
Fox, A. et al., "Cluster-based scalable network services", Proc. 16th ACM Symp. on Operating Systems Principles (Saint Malo, France, Oct. 5-8, 1997), W. M. Waite, Ed. SOSP '97. ACM Press, New York, NY, 78-91.
Fredman, M. et al., "Storing a Sparse Table with 0(1) Worst Case Access Time", J. ACM, vol. 31, No. 3 (Jul. 1984), 538-544.
Goldszmidt, M. et al., "Load Distribution for Scalable Web Servers: Summer Olympics 1996—A Case Study", In Proc. 8th IFIPIIEEE Int'l Workshop on Distributed Systems: Operations and Management, Sydney, Australia. Oct. 1997, 10 pgs.
Grigni, M. et al., "Tight Bounds on Minimum Broadcasts Networks", SIAM J. Disc. Math. 4 (May 1991), 207-222.
Gulbrandsen, A. et al., "A DNS RR for specifying the location of services", (DNS SRV), Network Working Group, RFC 2052, Oct. 1996, 1-10.
Guyton, et al., "Locating nearby copies of replicated Internet servers", Proc. ACM SIGCOMM '95; pp. 288-298 Oct. 1995.
Gwertzman, J. et al., "The Case for Geographical Push-Caching", Proc. Workshop on Hot OS '95 (May 4, 1995), 51-55.
Gwertzman, J. et al., "World-Wide Web Cache Consistency", Proc. 1996 USENIX Tech. Conf., pp. 141-151, San Diego, CA Jan. 1996.
Jeffrey, et al., "Proxy-Sharing Proxy Servers", IEEE pp. 116-119 1996, 1-4.
Karger, D. et al., "Consistent Hashing and Random Trees: Distributed Caching Protocols for Relieving Hot Spots on the World Wide Web", In Proc. 29th Annual ACM Symp. on Theory of Computing May 1997, 654-663.
Kwan, et al., "NCSA's World Wide Web Server: Design and Performance", IEEE Nov. 1995, pp. 68-74.
Litwin, W. et al., "LH*—A Scalable, Distributed Data Structure" *ACM Trans. on Database Systems*, vol. 21, No. 4, pp. 480-525, Dec. 1996, 1-43.
Luotonen, et al., "World-Wide Web Proxies", *CERN* modified May 24, 1994 Apr. 1994, 1-8.
Malpani, R. et al., "Making World Wide Web Caching Servers Cooperate", In Proc. 4th Int'l World Wide Web Conf. (downloaded from http://www.w3.org/ConferencesIWWW4/Papers/59/ on Jul. 7, 2007) Dec. 1995, 10 pages.
Mockapetris, et al., "Development of the Domain Name System", Proc. SIGCOMM '88 Computer Communications Review, vol. 18, No. 4, Aug. 1988, 112-122.
Mockapetris, P., "Domain Names—Concepts and Facilities", RFC 1034 Nov. 1987, 1-55.

Mockapetris, P., "Domain Names—Implementation and Specification", RFC 1035 Nov. 1987, 1-55.
Mourad, et al., "Scalable Web Server Architectures", iscc, 2nd IEEE Symposium on Computers and Communications (ISCC '97) Jul. 1997, pp. 12-16.
Nisan, N., "Pseudorandom generators for space-bounded computations", *In Proc. 22nd Annual ACM Symp. on theory of Computing* (Baltimore, MD, U.S.) H. Ortiz, Ed. STOC '90. ACM Press, New York, NY, May 13-17, 1990, 204-212.
Oguchi, et al., "A Study of Caching Proxy Mechanisms Realized on Wide Area Distributed Networks", High Performance Distributed Computing, 5th Int'l Symposium Aug. 1996, pp. 443-449.
Palmer, M. et al., "Fido: A Cache that Learns to Fetch", In Proc. the 17th Int'l Conf. on Very Large Data Bases Sep. 1991, 255-264.
Panigrahy, R., "Relieving Hot Spots on the World Wide Web", Master's thesis, MIT EECS Jun. 1997, pp. 1-66.
Peleg, D. et al., "The Availability of Quorum Systems", Information and Computation, 123; 210-223 (1995), 31 pages.
Peterson, E., "Cisco Takes Global Route" *PC Week News*, (Feb. 17, 1997) Feb. 17, 1997, p. 23.
Petri, S. et al., "Load Balancing and Fault Tolerance in Workstation Clusters. Migrating Groups of Communicating Processes", Operating Systems Review, vol. 29, No. 4 Oct. 1995, 25-36.
Plaxton, G. C. et al., "Fast Fault-Tolerant Concurrent Access to Shared Objects", In Proc. 37th IEEE Symp. of Foundations of Computer Science Oct. 1996, pp. 570-579.
Plaxton, G. C. et al., "Fast Fault-Tolerant Concurrent Access to Shared Objects", In Proc. 37th IEEE Symp. of Foundations of Computer Science, 570-579 1996, 10 pages.
Postel, J., "Domain Name System Structure and Delegation", RFC 1591 Mar. 1994, 1-7.
Rabin, M. O., "Efficient dispersal of information for security, load balancing, and fault tolerance", *J.ACM* 36, 2 (Apr. 1989), pp. 335-348.
Ross, K. W., "Hash-Routing for Collections of Shared Web Caches" *IEEE Network Magazine* 11, 7:37-44 Nov.-Dec. 1997, pp. 1-21.
Schemers, R. et al., "Ibnamed—A load balancing name server written in Perl", LISA IX; Monterey, CA Sep. 17-22, 1995, 1-12.
Schuba, C., "Addressing Weaknesses in the Domain Name System Protocol", *COAST Laboratory, Dept. of Computer Sciences, Purdue University;* West Layfayette, in Aug. 1993, 1-87.
Smith, Neil, "What can Archives offer the World Wide Web?", Technical Report 11, University of Kent, Computing Laboratory, University of Kent, Canterbury, UK Mar. 1994, 1-12.
Tarjan, R. E. et al., "Storing a Sparse Table", Commun.ACM, 22,11, (Nov. 1979), 606-611.
Thaler, D. G. et al., "Using name-based mappings to increase hit rates", IEEE/ACM Trans. Netw. 6,Feb. 1, 1998, 1-14.
Vitter, J. S. et al., "Optimal Prefetching via Data Compression", Proc. 32nd Annual IEEE Symposium on Foundations of Computer Science Oct. 1991, 21 pages.
Vixie, P., "Name Server Operations Guide for BIND", Internet Software Consortium; La Honda, CA; p. SMM:10-2-SMM:10-30 undated, 1996, 1-30.
Walsh, Jeff, "GlobalIP/PX Service Should Keep Network Delays Down", Infoworld (Jan. 20, 1997), 1-2.
Wessels, Duane, "Intelligent Caching for World-Wide Web Objects", Masters Thesis, University of Colorado (also presented at INET '95 in Jun. 1995) Jan. 1995, 1-85.
Yao, A. C., "Should Tables Be Sorted", J. ACM 28, 3 (Jul. 1981), 615-628.

\* cited by examiner

AUTOMATED MANAGEMENT OF CONTENT SERVERS BASED ON CHANGE IN DEMAND

CROSS-REFERENCE TO RELATED APPLICATIONS

The present application is a continuation of and claims the benefit of priority to U.S. patent application Ser. No. 12/048,669, titled "AUTOMATED MANAGEMENT OF CONTENT SERVERS BASED ON CHANGE IN DEMAND," filed Mar. 14, 2008, which is incorporated by reference herein for all purposes. Application Ser. No. 12/048,669 is a continuation of and claims the benefit of priority to U.S. patent application Ser. No. 09/969,437, titled "AUTOMATED SERVER REPLICATION," filed Oct. 2, 2001, which is incorporated by reference herein for all purposes.

BACKGROUND

This invention relates to automated server replication.

The popularity of the World Wide Web as a communications medium lies in the richness of its information content and ease of use. Information in this medium exists as objects in a widely distributed collection of internetworked servers, each object uniquely addressable by its own Uniform Resource Locator (URL). The proliferation of commercial applications on the World Wide Web brings with it an increasing number of users making ever-increasing numbers of requests for web content. The problems of latency and bandwidth considerations manifest themselves in delay and lost information.

Network architects respond using an array of solutions, one of which is the server farm. This involves the use of multiple web servers with identical content, or the segmentation based upon functionality. For example, two servers for web functions, two for File Transfer Protocol (FTP), two as a database, and so forth. The use of multiple servers solves one problem at the expense of creating another. If there are multiple servers, how does the end user locate a particular web site? Presently, names and Universal Resource Locator (URLs) are resolved into unique single addresses by a Domain Name Service (DNS) residing in a DNS server. DNS servers maintain a list of domain names cross referenced to individual Internet Protocol (IP) addresses. However, if multiple web servers or server farms are used, a modified version of DNS service is used. A common approach to this problem is to modify the DNS system to be aware of a one-to-many mapping, of names-to-IP-addresses. Thus, the DNS will return an IP address that comes from a list of possible IP addresses that correspond to a particular web object. Thus, from one moment to the next, a DNS query will resolve to different FP addresses. In this example, the modified DNS decides which IP address to return based on how busy each of the servers is.

In current network management systems, there are various methods of detecting and monitoring the load across a server or a server farm. One system uses a load capacity detection agent to monitor the load across a server or a server farm. In this system, when the load detection agent detects that a server farm, for example, is experiencing excess load, the agent notifies a system administrator of the system. The system administrator may decide to manually take action to either reduce the load across the server farm, or alternatively, increase the available load capacity by adding a server to the server farm. Generally, the system administrator adds a server by manually identifying an additional available server, and then modifying the entries in the load management system to include the IP address of the recently-added content server.

SUMMARY

In general, in one aspect, the invention provides a method and apparatus, including a computer program apparatus, implementing techniques for detecting a change in demand for server resources across a load-bearing system having one or more content servers hosting identical content, the load-bearing system being connected to a network of content servers; and automatically modifying the number of content servers on the load-bearing system in response to the change in demand.

Each content server on the network may be categorized as active or idle. The hosted content may be assigned a priority level, and a number defining a maximum number of content servers on the load-bearing system. A content server may be added to the load-bearing system if the change in demand is greater than a pre-configured threshold and the number of content servers on the load-bearing system is less than a maximum number assigned to the hosted content. The number of content servers may be modified by selecting an available content server on the network; loading hosted content onto the selected content server; and adding the selected content server to the load-bearing system. All of the content servers on the load-bearing system including the selected content server host identical content. The available content server having the lowest priority level, the highest available load capacity, or the least number of active sessions may be selected.

The hosted content may be assigned a number defining a minimum number of content servers on the load-bearing system. A content server may be removed from the load-bearing system if the change in demand is greater than a pre-configured threshold and the number of content servers on the load-bearing system is greater than a minimum number assigned to the hosted content. The content server having the highest available load capacity or the least number of active sessions may be removed.

Embodiments may have on or more of the following advantages. The invention uses scripting, or other software techniques, to automate the addition or removal of a content server from a load-bearing system. Automating the addition and removal of content servers gives, for example, a web hosting operation a way to manipulate server resources between high-activity servers and low-activity servers without requiring any user intervention. In particular, the invention serves the needs of "seasonal" or "spiky" web applications, such as tax preparation services or Superbowl-related web sites, which experience a tremendous increase in the number of hits at specific times of the year.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Referring to FIGS. 1a-1d, an exemplary internetwork 100 includes a network of servers 102 connected to a network of clients 104 through the Internet 106. The network of servers 102 includes a management server 108 and a group of content servers 110.

The content servers 110 are nodes on the network 102 that perform the actual serving of content, for example, Web pages or FTP files. Although only nine content servers 110 are shown in FIGS. 1a through 1d, it will be understood that any number of content servers may be connected to the network 102. Each content server 110 is capable of receiving queries from clients, doing substantially all the processing necessary to formulate responses to the queries, and providing these responses to the clients. Web servers, for example, respond to requests from clients (e.g., through browser software) for access to files and data. Other types of servers allow clients to share access to network devices, such as shared printers or disk storage.

In one exemplary commercial setting, each content server 110 is a managed node on the network 102 maintained by a network operator, such as Genuity Inc. of Woburn, Mass. By the term "managed node", it is meant that each content server 110 runs a management process that allows another computer to query the managed node for information. For example. Simple Network Management Protocol (SNMP) describes how a computer formats a message to send to the managed node. Software on the managed node, called an SNMP agent (not shown), examines SNMP messages it receives, and responds accordingly. Each SNAP agent maintains a local database of variables that describe the state of the content server 110 and may, optionally, affect its operation. Each SNMP agent's local database includes, but need not be limited to the following: the number of packets and bytes sent and received from the Internet 106, the number of broadcasts, the current output queue size, the current transaction rate, the current processor utilization, and the current disk utilization.

Content servers 110 are the systems which store information that may be accessed using web browser software such as Netscape Communicator® and Microsoft's Internet Explorer®. Content servers transmit their information in response to receiving, a message of a format specified by Hyper Text Transfer Protocol (HTTP). The format of the server's response is also specified by HTTP, and is understood by web browser software.

Network management on the network 102 can be done from management servers, an example of which is shown as management server 108, which are general-purpose computers running management software. The management server 108 interacts with the SNMP agents in the content servers 110 using the SNMP protocol. This protocol allows the management server 108 to query the state of an agent's local variables, and change them if necessary. For example, the management server 108 can issue commands and get responses that allow the management server 108 to monitor the resources available (i.e., available load capacity) cm each content server 110, and express them in a way that enables the content servers 110 to be categorized as active or idle. In one example, the management server 108 only considers the CPU resource, and neglects all others. In other implementations, the management server 108 uses a more complex combination of considerations, with load metrics ranging from the instantaneous CPU utilization and IO queue length, through to a linear combination of CPU, memory and IO queue lengths. The management server 108 can also modify network routing tables, and change the status of network links and devices. The collection of all possible variables available via SNMP is given in a data structure called the Management Information Base (MIB), which is formally defined in the Internet Engineering Task Force (IETF) Request For Comment (RFC) 1213. The IETF is a large open international community of network designers, operators, vendors, and researchers concerned with the evolution of the Internet architecture and smooth operation of the Internet—it is open to any individual.

The management server 108 also houses several other software components, which include in one implementation, an image manager 116, and a content storage system 118. In the illustrated examples on FIGS. 1a-1d, a single server implements the software components of the management server 108. However, it should be noted that two or more servers connected to the network 102 may implement the software components.

The router 114 uses any one of a number of dynamic routing algorithms (e.g., distance vector routing and link state routing) to decide where to send packets addressed to a particular IP address; for example, how to get to a particular content server which are all distinguished based on their assigned IP address. Dynamic routing algorithms change their routing decisions in response to changes in the topology of the network 102. A set of files is stored in the content storage system 118. Each file contains content data, applications and all the necessary software required to implement a web site presence on the Internet 106. Each file can be loaded onto a content server 110 by the image manager 116. In one implementation, the image manager 116 maintains a table (shown below) that includes, for each file, a priority level, a minimum number and a maximum number of content servers 110 that can be used to implement the web site. The priority level indicates to the management server 108 the relative importance—to the network operator, Genuity Inc., for example—of implementating a particular web site in situations in which several web sites are vying for limited server capacity. In one implementation, a five-point scale is used to designate a priority level: "highest", "high", "medium", "low" and "lowest". Generally, the higher the priority level assigned to a file, the more server resources (up to the maximum number of content servers 110 identified in the table) are allocated to implement the web site. By default, content servers 110 that are idle are assigned a "lowest" priority level. When a file having a "highest" priority level is loaded onto a content server 110 that is idle, for example, the priority level of the content server 110 changes from "lowest" to "highest".

Assume, for example, that three files—file "A" file "B", and file "C"—are stored in the content storage system 118. The second, third and fourth table entries are populated with the following data:

| File | Priority Level | Min. Number | Max. Number |
|------|---------------|-------------|-------------|
| A    | highest       | 1           | 7           |
| B    | medium        | 1           | 3           |
| C    | low           | 1           | 3           |

Figure 1A:
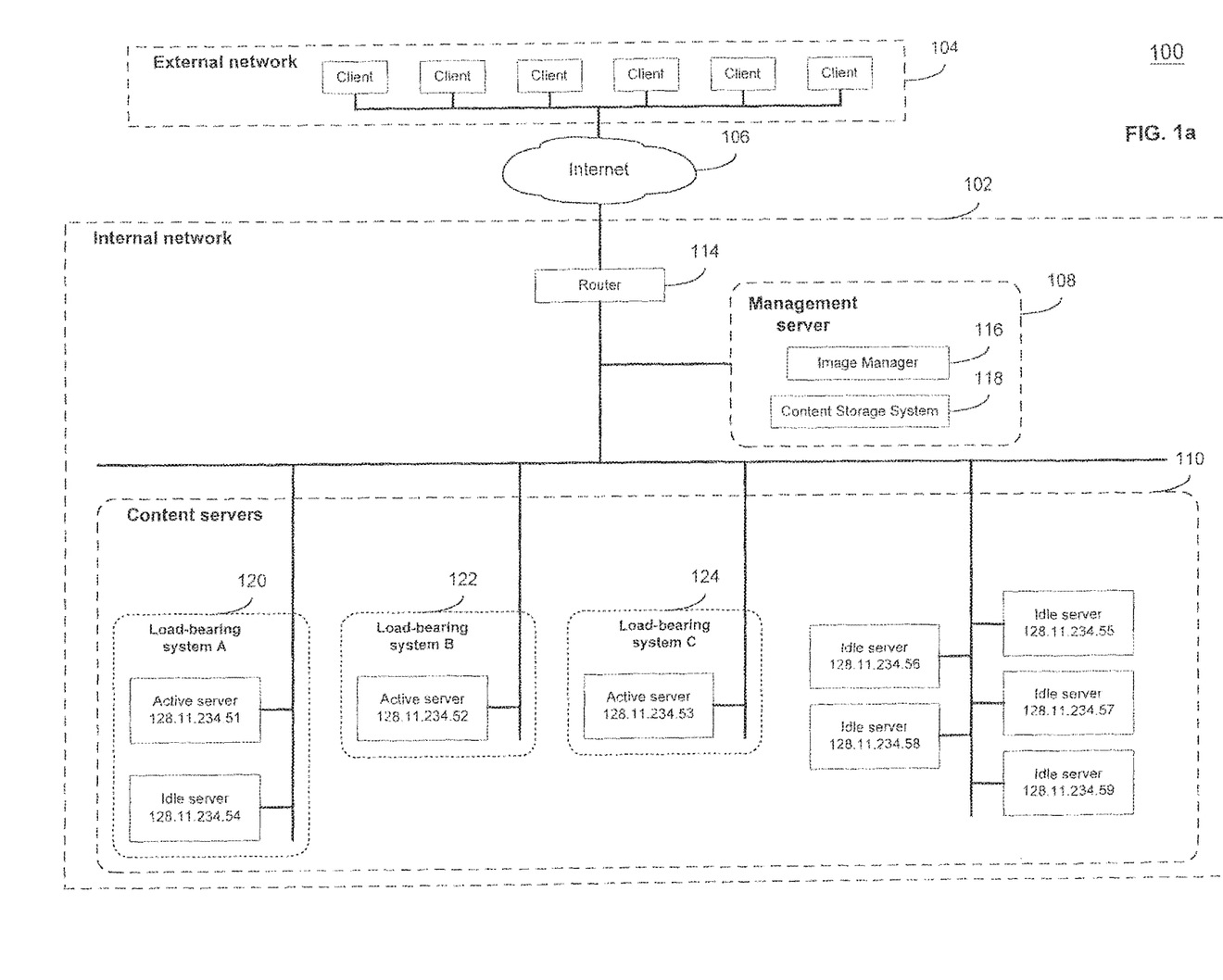
FIGS. 1a-1d are block diagrams illustrating an internetwork topology including an network of content servers and a management server.

Initially, each file is loaded and run on one or more content servers 110, indicated in dashed lines in FIG. 1a as load-bearing system A 120, load-bearing system B 122, and load-bearing system C 124. If a load-bearing system, such as load-bearing system A 120, has multiple content servers 110, the load on the system is distributed using one of the following schemes: (1) a load-sharing scheme; (2) a load-balancing scheme; or (3) a load-leveling scheme. Generally, content servers 110 in a load-sharing system that utilizes the load-sharing scheme are viewed in binary. That is, the server is either idle or busy, and load may only be placed on idle servers. Load-balancing schemes attempt to ensure that the load on each content server 110 in the system is within a small degree of the load present on every other content server in the system. Load-leveling schemes can be viewed as the middle ground between the load-sharing and load-balancing schemes. Rather than trying to obtain an even distribution across the system, or utilizing only the content servers 110 that are idle, the load-leveling scheme distributes load in a manner that minimizes congestion.

Figure 2:
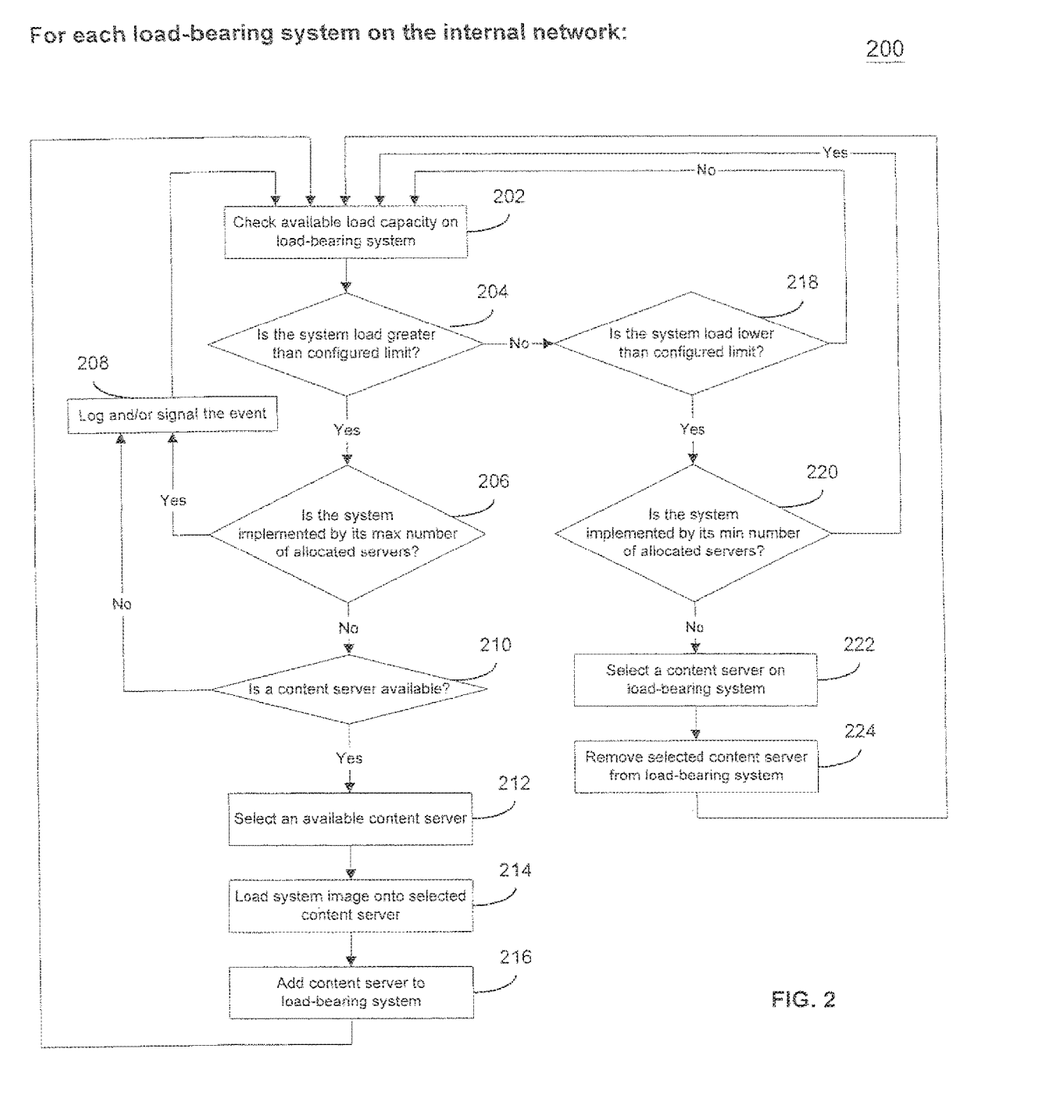
FIG. 2 is a flowchart of a process for automatically modifying the number of content servers on a load-bearing system.

Referring to FIG. 2, a process 200 residing in the management server 108 periodically checks (202) the available load capacity on each load-bearing system. In one implementation, the process 200 polls each content server 110 in a load-beating system to determine its available load capacity.

Figure 1B:
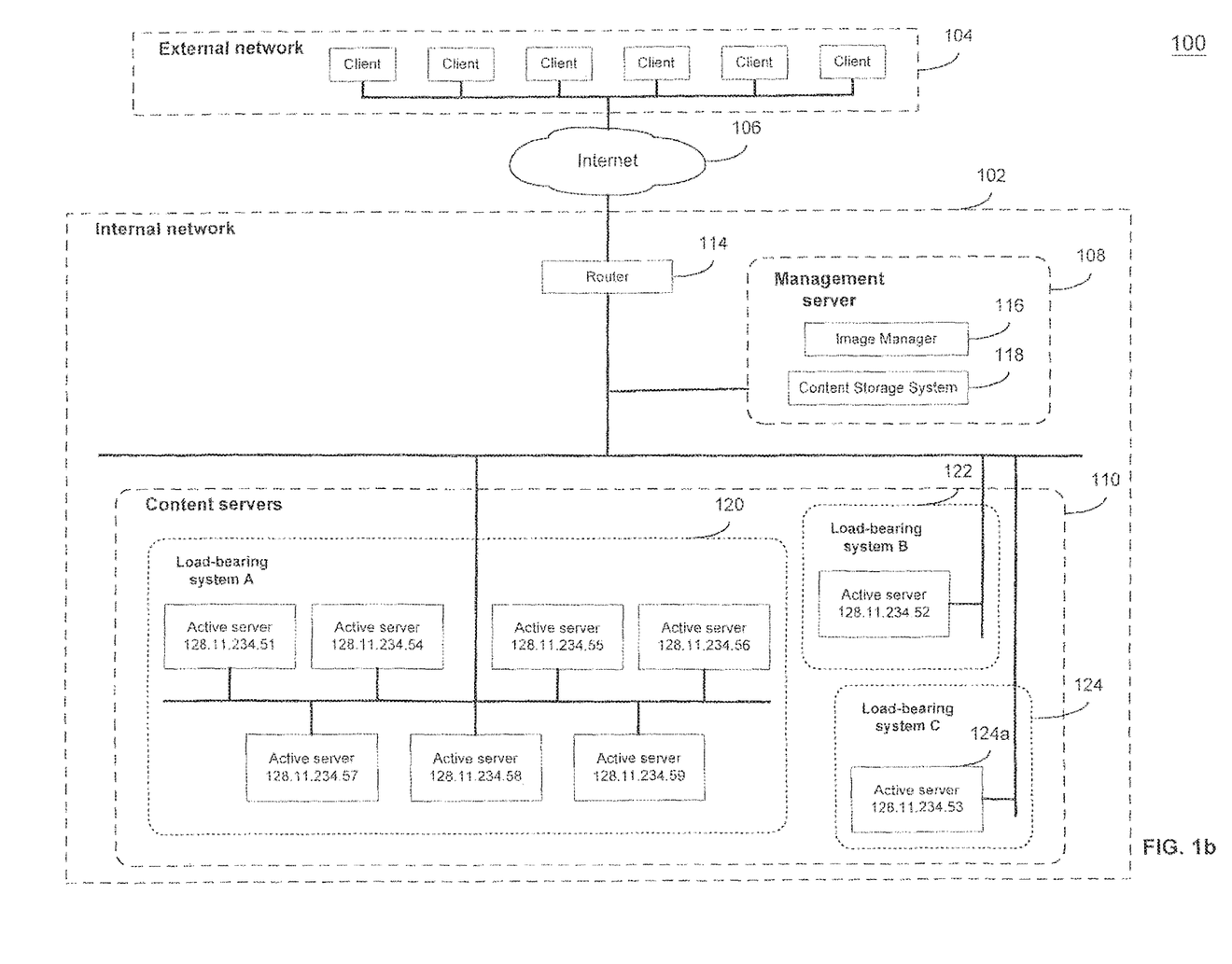

If the process 200 detects (204) that the load on the load-bearing system B 122, for example, is greater than a preconfigured threshold level (i.e., there is insufficient aggregate available load capacity), the process then determines (206) whether the number of content servers 110 in the load-bearing system B 122 is less than the maximum number that may be allocated to that system. If so, the process 200 will add a content server 110 to the load-bearing system B 122 if one is available. By use of the term "available", it is meant that the content server 110 is idle and may be added to a load-bearing system, or alternatively, the content server has a lower priority level and may be removed from a particular load-bearing system and allocated to a different load-bearing system. For example, as shown in FIG. 1b, if the load-bearing system C 124 is implemented by a single content server 124a, the content server 124a is not available for re-allocation to either of the other two load-bearing systems 120 and 122, because the network operator has designated in the table that at least one content server 110 in the network 102 must be allocated to the load-bearing system C 124.

Figure 1C:
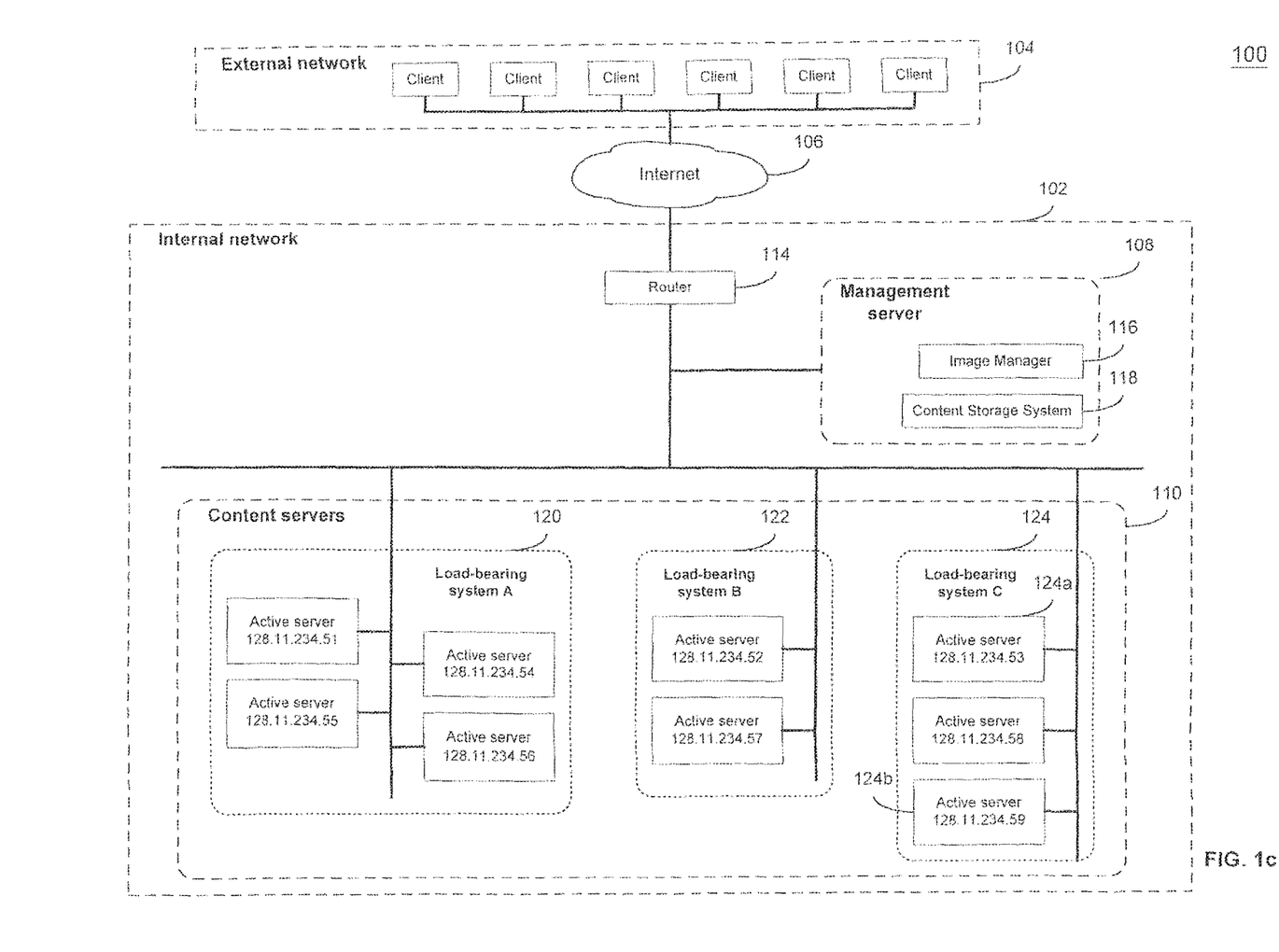

The process 200 first polls all of the content servers 110 on the network 102 to determine (210) if there is an available content server 110 on the network 102. If none of the content servers 110 are available, the process 200 logs and signals the event (208) to the network operator maintaining the network 102. Otherwise, the process 200 selects (212) one of the available content servers for addition to the load-bearing system B 122. If there are multiple available content servers 110, the process 200 will typically select one that is idle for addition to the load-bearing system B 122. However, if all of the available content servers 110 on the network 102 are active, as shown in FIG. 1c, the process 200 makes the selection as follows:

(1) If there is only one available content server 110, the process 200 selects that content server 110.

(2) If there are multiple available content servers 110, the process 200 selects the content server 110 having the lowest priority level.

(3) If there are multiple available content servers 110 having the lowest priority level, the process 200 polls each of those content servers 110 to determine which content server 110 has the highest available load capacity and selects that content server 110. Alternatively, the process 200 polls each of those content servers 110 to determine which content server 110 has the least number of running processes in progress (called "active sessions") and selects that content server 110.

Figure 1D:
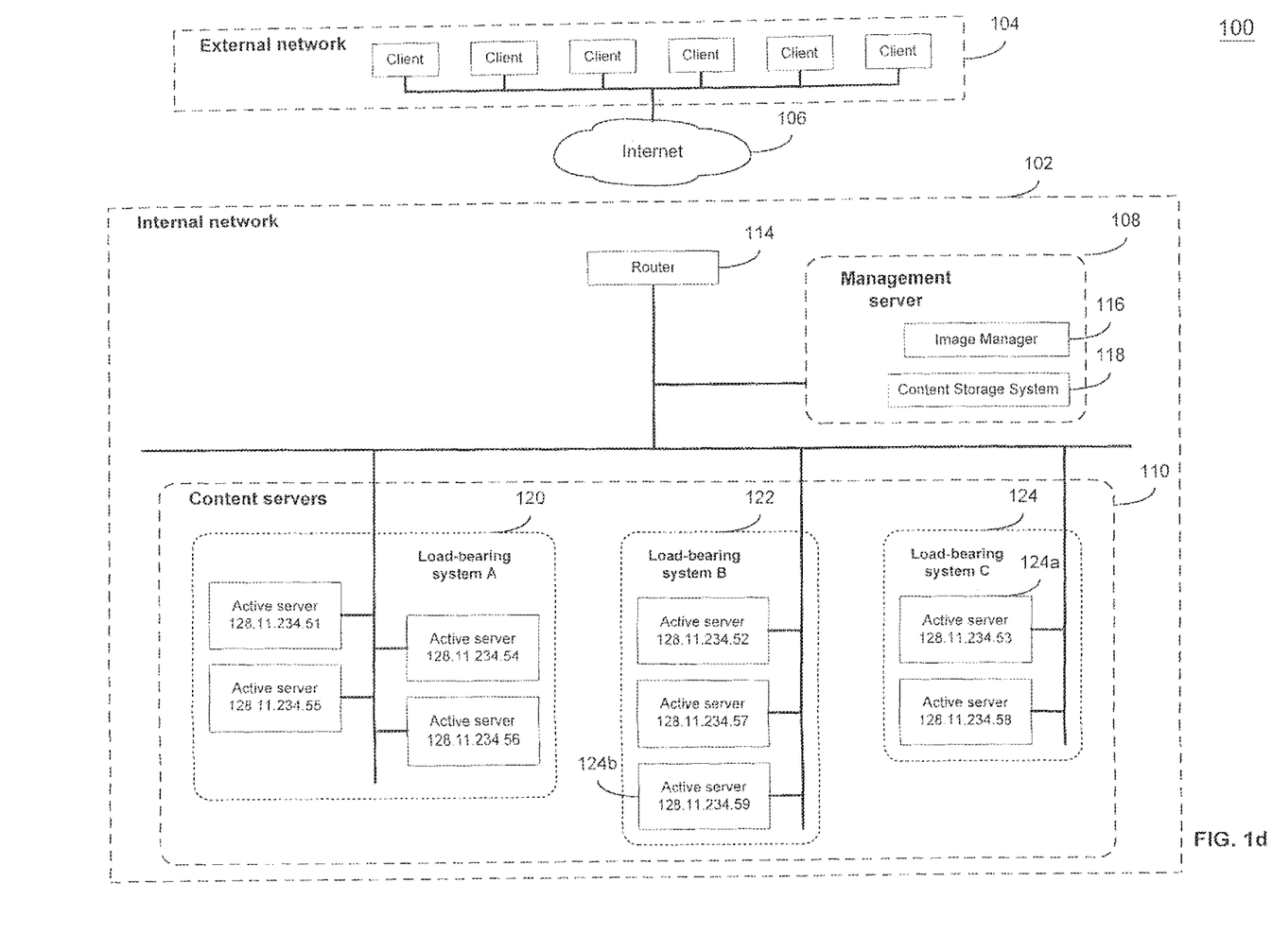

Once the selection is made, say, for example, the process 200 selects the content server having an IP address of "128.11.234.59" 124b in the load-bearing system C 124, as shown in FIG. 1c, the process 200 can be configured to immediately stop all future client queries directed to the load-bearing system C 124 from being sent to the selected content server 124b for processing. The process 200 can also be configured to wait until all of the active sessions on the selected content server 124b have been terminated before removing that content server 124b from the load-bearing system C 124. Once removed, the process 200 retrieves the file "B" from the content storage system 118 and uses the image manager 116 to load (214) it onto the selected content server 124b. Referring to FIG. 1d, the process 200 then starts the selected content server 124b having the recently-loaded file "B", and modifies the DNS system to add (216) the content server having an IP address of "128.11.234.59" 124b to the load-bearing system B 122. Thereafter, when to client requests a service by entering in a web browser the URL for the web site implemented by the load-bearing system B 122, the request can be directed to the content server 124b.

Referring to FIG. 1c, if the process 200 detects (218) that the load on the load-hearing system B 122, for example, is less than a preconfigured threshold level, the process 200 then determines (220) whether the number of content servers 110 in the load-bearing system B 122 is more than the minimum number that may be allocated to that system 122. If so, the process 200 may select (222) a content server 110 from the load-bearing system B 122 for removal if the aggregate available load capacity of the load-bearing system B, the historical demand for services implemented by the load-hearing system B, as web as damping considerations, among others, warrants removal of a content server. The process 200 selects a content server for removal much in the same manner described above. That is, the selection may be made by polling each of the content servers 110 in the load-bearing system B 122 to determine which content server 110 has the highest available load capacity and selecting that content server 110. Alternatively, the selection may be made by polling each of those content servers 110 to determine which content server 110 has the least number of active sessions and selecting that content server 110. The process 200 can be configured to wait until all of the active sessions on the selected content server 110 have been terminated before removing (224) that content server 110 from the load-bearing system B 122, and categorizing it as idle.

Other embodiments are within the scope of the following claims.

What is claimed is:

1. A method comprising:

using a computer to detect a change in demand for server resources across a first load-bearing system having content servers hosting content;

in response to the change in demand, determining, from the content servers hosting the content, two or more content servers having a lowest priority level from a set of priority levels;

in response to determining that two or more content servers have the lowest priority level, determining, from the two or more content servers, a first content server having a least number of active sessions and selecting, from the two or more content servers, the first content server;

stopping client requests from being directed to the first content server based on determining the first content server having the least number of active sessions;

based on determining the first content server having the least number of active sessions, determining to wait until existing active sessions have been terminated on the first content server before removing the first content server from the first load-bearing system;

storing an entry in a table, wherein the entry is associated with the hosted content, and wherein the entry indicates a priority level, a minimum threshold of content servers, and a maximum threshold of content servers;

removing the first content server from the first load-bearing system, in response to a total number of content servers on the first load-bearing system being greater than the minimum threshold of content servers associated with the hosted content;

adding the removed first content server to a second load-bearing system having one or more other content servers hosting separate content, in response to a number of the one or more other content servers on the second load-bearing system being less than the maximum threshold of content servers associated with the separate hosted content, the second load-bearing system connected to the first load-bearing system via a network connection;

causing the separate hosted content to be stored on the removed first content server;

causing client requests for the separate hosted content to be directed to at least the removed first content server on the second load-bearing system;

receiving a first content file on a second content server, wherein the second content server is at an idle state, wherein the idle state corresponds to a lowest priority level, and wherein the first content file is at a highest priority level; and setting a priority of the second content sever to the highest priority level based on the first content file.

2. The method as recited in claim 1, wherein the removed content server hosts content of a lower priority level than a priority level of content hosted by other content servers on the second load-bearing system.

3. The method as recited in claim 1, wherein the set of priority levels includes highest, high, medium, low, and lowest.

4. The method as recited in claim 1, further comprising loading a copy of the first content file onto a third content server of the one or more other content servers by an image manager in communication with the second load-bearing system.

5. The method as recited in claim 1, wherein causing client requests for the separate hosted content to be directed to the removed first content server or second content server on the second load-bearing system further comprises modifying a routing system to add an address of the first content server or an address of the second content server to the second load-bearing system.

* * * * *